United States Patent [19]

Sims

[11] 4,323,383
[45] Apr. 6, 1982

[54] METHOD AND APPARATUS FOR UNIFORMLY HEATING A GLASS STREAM WITHIN THE FEEDER OF A GLASS MELTING FURNACE

[75] Inventor: George R. Sims, Lohr am Main, Fed. Rep. of Germany

[73] Assignee: Nikolaus Sorg GmbH & Co. KG, Postfach, Fed. Rep. of Germany

[21] Appl. No.: 183,618

[22] Filed: Sep. 2, 1980

[30] Foreign Application Priority Data

Sep. 1, 1979 [DE] Fed. Rep. of Germany ....... 2935416

[51] Int. Cl.³ ............................................. C03B 5/027
[52] U.S. Cl. ........................................ 65/135; 65/327; 65/DIG. 4; 373/33; 373/40
[58] Field of Search ................... 65/326, 327, DIG. 4, 65/134, 135; 13/6, 34

[56] References Cited

U.S. PATENT DOCUMENTS

| | | | |
|---|---|---|---|
| 1,853,843 | 4/1932 | Bates et al. | 65/326 X |
| 1,928,288 | 9/1933 | Henry | 65/326 X |
| 2,516,570 | 7/1950 | Hartwig et al. | 13/34 |
| 4,049,899 | 9/1977 | Shimizu et al. | 13/6 |

Primary Examiner—Arthur D. Kellogg
Attorney, Agent, or Firm—Sprung, Felfe, Horn, Lynch & Kramer

[57] ABSTRACT

A method and a system for uniformly heating a glass stream flowing in the feeder of a glass melting furnace wherein power or energy is supplied through the electrodes immersed in the glass melt and wherein the temperature of the glass stream is continuously detected, has the current flowing between cooperating electrodes maintained constant independently of the resistance defined by the glass melt by controlling the voltage as long as the temperature of the glass stream does not deviate from predetermined limits and the current flow of at least a number of electrodes positioned at the inlet of the feeder are controlled to compensate for temperature variations when the tolerable deviation limit has been exceeded.

7 Claims, 4 Drawing Figures

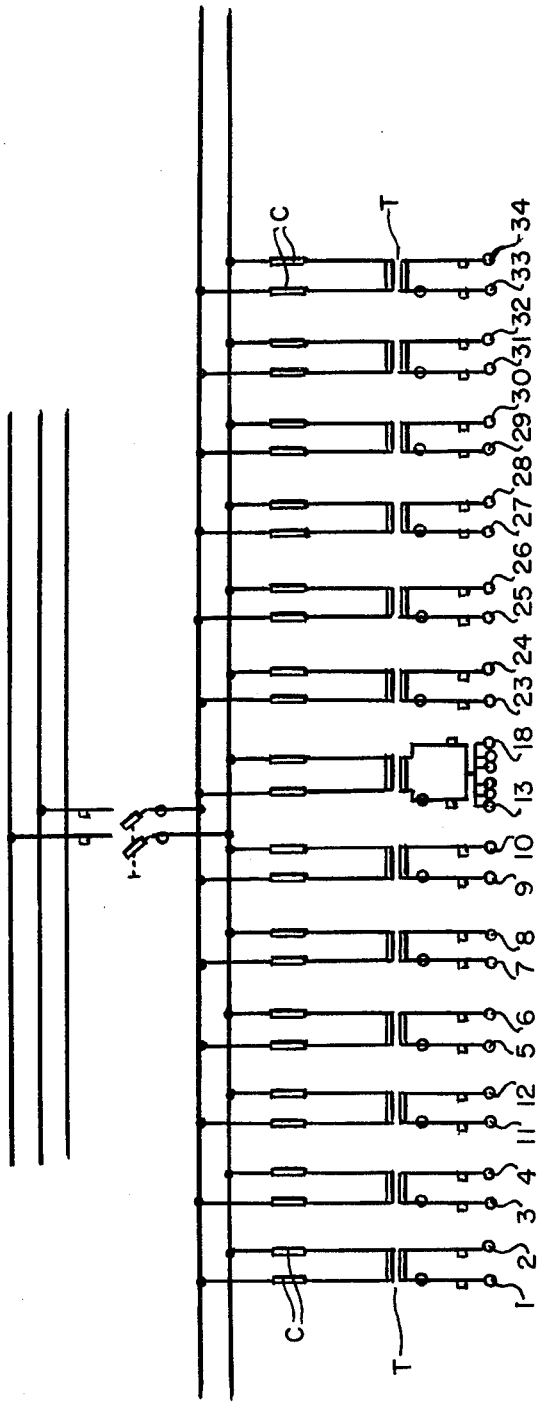
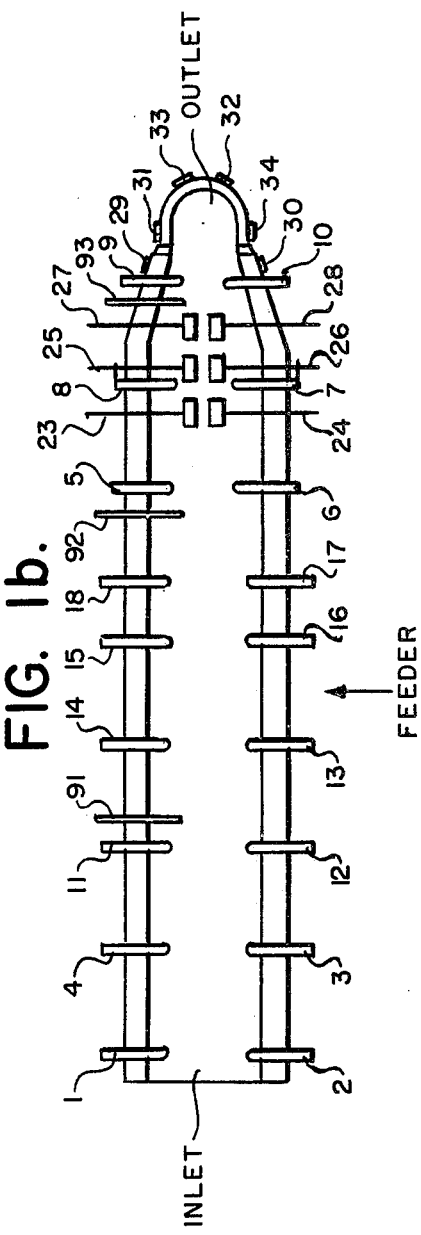
FIG. 1a.
FIG. 1b.

METHOD AND APPARATUS FOR UNIFORMLY HEATING A GLASS STREAM WITHIN THE FEEDER OF A GLASS MELTING FURNACE

BACKGROUND OF THE INVENTION

The present invention relates to a method for uniformly heating a glass stream flowing in the feeder of a glass melting, furnace, wherein power or energy is supplied through electrodes immersed in the glass melt, and wherein the temperature of the glass stream is continuously detected, as well as to a system for carrying out such method and including electrodes which pass on opposite sides through the wall of the feeder in pairs and which are conductively connected to windings of transformers, and further comprising temperature detecting elements for detecting the temperature of the glass stream at least in the inlet region of the feeder.

It is known to connect in groups, the electrodes passing horizontally through the sidewall of the duct, which groups may be termed heating zones. In this system, the electrodes are connected in parallel circuit configuration to the secondary portion of a transformer, with the electrodes of one heating zone being controlled in combination through a voltage regulator (thyristor or variable-ratio transformer). In this system, the electrodes on the one side of the feeder are electrically connected to the one output side of the secondary portion of the transformer, while those of the other side are connected to the opposite side of the transformer which may be a variable-ratio transformer, as known. Systems of this type are described, for example, in U.S. Pat. No. 4,029,488, and suffer from the drawback, however, that identical voltages exist between the pairs of electrodes of each heating zone, although different resistance are present across the glass stream such that different degrees of power consumption exist therein. Accordingly, it is not possible to compensate in an optimum manner for temperature non-homogeneities in the glass stream.

It is further known from German laid-open application No. 2,626,788 to effect the uniform heating of molten glass by connecting the pairs of electrodes to power sources in the form of transformers, the primary windings of which are series-connected and with each secondary winding conductively connected to a pair of electrodes.

Actually, this system allows the control of the output power between each electrode pair to equal values by combining the outputs of all pairs of electrodes however, it is a disadvantage of this system that control of the output of separate electrode pairs is not feasible so that the compensation of temperature variations can be effected only to a limited extent. Accordingly, particularly in the case when control should be effected because of a spontaneous undesirable temperature variation, an over-correction takes place which results in impairment of the operation.

In view of the fact that temperature measuring cells or detectors in most instances respond only with a time delay, a satisfactory solution to the existing problems is not even possible with the use of such elements and with the employment of the conventional manually variable transformers.

It is a further disadvantage of the conventional control systems or feeder heating systems that, due to the direct heating by means of electrodes, the thermal homogeneity must necessarily be imperfect, because power concentration at the tip ends of the electrodes occurs and the current still flows through regions of higher temperature because of the lower resistances existing therein. Thus, the cooler portions can be heated only insufficiently, and the desired temperature homogeneity only can be obtained imperfectly because of the deficiencies of such systems.

SUMMARY OF THE INVENTION

Accordingly, it is the object of the present invention to provide a method and a system for heating a glass stream within the feeder of a glass melting furnace, wherein the above-discussed drawbacks are avoided and which allow same to obtain maximum temperature homogeneity even in the case of temperature variations in the glass stream flowing through the feeder, so as to provide optimum quality of the discharged glass. The solution according to the invention is contemplated to facilitate not only uniform temperature distribution across the cross-section of the discharged glass, but, furthermore, to permit positive maintainance of the desired glass temperature with reasonable structural expenditure even during variations in furnace operation.

According to the invention, this object is solved in that the current flowing between cooperating electrodes is maintained constant independently of the resistance defined by the glass melt, by controlling or regulating the voltage as long as the temperature of the glass stream does not deviate by a predetermined amount from a set value, and that the current flow of at least a number of electrodes positioned at the inlet of the feeder is controlled or regulated to compensate for temperature variations, when the tolerable deviation limit has been exceeded.

Preferably, the power supply may be effected with a fixed ratio which is not varied even during a control phase, wherein for simplification and for improved efficiency the electrodes disposed at the rear or downstream of the feeder inlet are controlled in combination with respect to their current flow in dependency of the desired temperature, with the electrodes being connected in parallel.

In order to equalize the temperature of the glass prior to the discharge thereof from the feeder, and particularly for heating cooler points within the glass stream, electric current may be introduced into the refractory material of the feeder upstream of the feeder outlet and thereat, such that the current then flows partially through the refractory material and partially through the glass bath (melt).

Advantageously, the system for carrying out the present method is characterized in that the electrodes of each pair are connected to the output end of the secondary winding of a variable transformer at least in the inlet region of the feeder, with the voltages of the transformers for a number of adjacently positioned pairs of electrodes defining a fixed ratio among one another, which ratio is not varied even during the control or regulating phase; and that a current regulator is connected to the primary side of each transformer.

Preferably, the electrodes arranged downstream of the inlet portion of the feeder are connected in parallel with each other and connected to the secondary side of a transformer, with a plurality of paired contacts being provided upstream of the outlet of the feeder and at such outlet, which contacts are adapted to be pressed against the refractory material of the feeder, and each pair of contacts being conductively connected to the secondary side of a transformer.

In an alternative embodiment, the contacts abutting the refractory material may be connected in parallel with each other and connected to the secondary side of a transformer, the contacts being provided with means for effecting cut-off if a current higher than a predetermined current flow exists between a given pair of contacts.

DESCRIPTION OF THE DRAWINGS

An embodiment of the invention is explained with reference to the accompanying drawings wherein:

FIG. 1a is a block diagram of a feeder heating system according to the invention and FIG. 1b is a schematic of the electrode and contact arrangement;

DETAILED DESCRIPTION OF THE INVENTION

Figure 2:
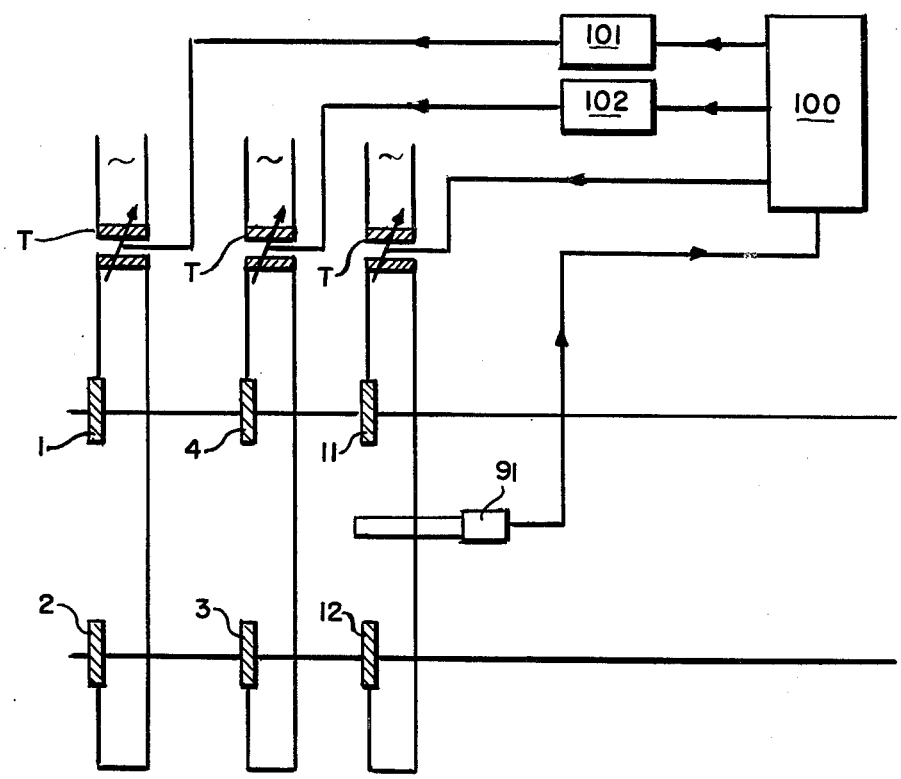
FIG. 2 is a schematic block diagram of the cascade-type control of the electrodes positioned in the inlet region of the feeder including the temperature control.

As shown in the drawings, a plurality of electrodes 1-4, 11 and 12 are arranged in the inlet portion or region of the feeder. Each pair (1, 2; 3, 4; 11, 12) of electrodes are electrically connected to the outputs of a secondary coil or winding of a variable-ratio or regulating transformer T (FIG. 2). The power consumed by each pair of electrodes is maintained constant by means of a current regulator C, as long as the temperature deviations or variations do not exceed a given limit. Temperature sensors or detectors 91 to 93 sense the temperature of the glass interiorly of the feeder to thereby vary, through output-limiting thyristors in regulator 100, the output power provided by the electrodes when a given, variable range of deviation is exceeded.

Further, the electrodes, as shown in FIG. 2, can be grouped into heating zones, and in each heating zone the power consumption or input betwen adjacent pairs of electrodes can be set to a fixed ratio, and all electrodes of one heating zones can be controlled jointly or in combination with one another.

Accordingly, constant power is set for each pair of electrodes or for two adjacently positioned pairs of electrodes each by means of the current regulator C, with the power being in a fixed ratio with respect to the power of the adjacent pairs of electrodes resulting from the settings of rheostats 101 and 102 for pairs 1, 2 and 3, 4 with respect to pair 11, 12. Thus, when temperature deviation limits are exceeded, the power level of the entire heating zone is raised by regulator 100 which acts on the transformers T of the pairs either directly in the case of pair 11, 12 or through current controllers 101, 102 in the case of pairs 1, 2 and 3, 4 when the detected temperature is too low, and lowered by the same means when the detected temperature is too high. In this way, every area directly between each electrode pair is supplied with the necessary energy, regardless of the temperature of the glass, and the glass temperature is prevented from affecting the energy supplied to the glass and the distribution of this energy by way of the temperature-responsive resistance.

Figure 3:
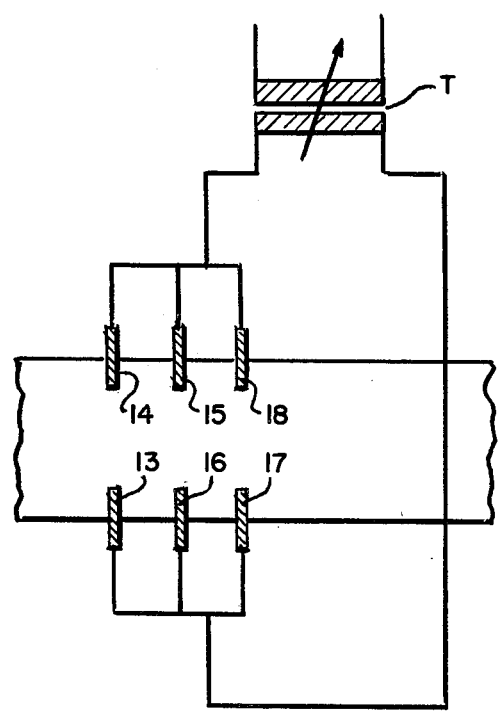
FIG. 3 is a schematic block diagram of the parallel circuit connection of the electrodes as alternatively disposed at the rear, or downstream of, the feeder inlet region.

In order to reduce costs, a plurality of electrodes 13-18, may be arranged at the rear or downstream of the inlet region, which electrodes are connected in a parallel circuit, as shown in FIG. 3, with each group of electrodes of one heating zone being connected to the output of the secondary portion of a variable-ratio transformer. In this circuit configuration, the power consumption by the glass melt may be maintained constant with the aid of thyristors by way of current control or regulation, by correspondingly lowering the voltage in the case of an increasing current flow, and raising the voltage when the current flow decreases, respectively.

Alternatively, however, the center region of the feeder may also use a circuit of the type described for the inlet region and shown in FIG. 2, namely, each pair of electrodes 5-8 and 9-10 has its own current regulating means, and regulation of the power output is effected in response of a temperature detection by sensors 92 and 93, respectively, with adjacently disposed electrodes delivering their output power into the glass melt in a fixed ratio relative to each other.

In order to still further improve the homogeneity at the feeder outlet, a plurality of contacts 23 to 34 are provided at the outlet, of which contacts 29-34 are resiliently pressed against the refractory material of the feeder, and each pair of contacts being connected to the output of the secondary winding of a variable-ratio transformer T. Current regulating means C are also provided for these transformers, such that overheating of the refractory material in the region between two contacts is positively avoided. In an alternative construction, each heating circuit through the refractory material may be disconnected or turned off when the current consumption within one circuit becomes excessive. A corresponding feeder heating system is disclosed in greater detail in such that a more detailed illustration thereof may be omitted. From the contacts, current flows through the refractory material which is conductive at high temperatures, or has been rendered conductive by adding substances. In this structure, current flows, on the one hand, directly through the refractory material by contacts 29-34 and, on the other hand, also through the glass by electrodes 23-28 which flows closely adjacent to the contacts within the feeder. In this way, it becomes possible to sufficiently heat even otherwise inaccessible portions of the glass streams, without giving rise to energy or power concentration interiorly of the glass mass which, in turn, would produce temperature non-homogeneities. Accordingly, an absolutely temperature-homogeneous glass may be produced, whereby such homogeneity is controlled predominantly in the area of the feeder outlet, whereas the compensation of temperature variations of the glass entering the feeder is mainly effected at the inlet of the feeder in the manner as described above.

Owing to the fact that the invention allows to make use of commercially available components, namely thyristors, transformers and temperature sensors or detectors, i.e. pyrometers or thermocouples, the system according to the invention is not only particularly efficient, but also safe in operation, such that it may be spoken of an ideal solution to the existing problems.

What is claimed is:

1. In a method for uniformly heating a glass stream flowing from the inlet to the outlet of a feeder of a glass melting furnace, wherein power or energy is supplied through electrodes immersed in the glass melt, and wherein the temperature of the glass stream is continuously detected, the improvement comprising the steps of: maintaining the current flowing between cooperating electrodes constant independently of the resistance of the glass melt, by controlling the voltage as long as the temperature of the glass stream does not deviate by a predetermined amount from a set value, regulating the current flow of at least a number of electrodes positioned at the inlet of the feeder to compensate for temperature variations, when the tolerable deviation limit has been exceeded and introducing electric current into the refractory material of the feeder to flow therein at least in front or upstream of the outlet of the feeder and at said outlet.

2. The method according to claim 1, wherein the power supply to the electrodes arranged at least at the inlet of the feeder is effected in a fixed ratio wherein the fixed ratio which is not varied during regulating of the current.

3. The method according to claim 1 or claim 2, further comprising commonly controlling the current flow across electrodes disposed downstream of the feeder inlet for all electrodes in dependency of the desired temperature.

4. In a system for uniformly heating a glass stream flowing from the inlet to the outlet of a feeder of a glass melting furnace of the type wherein energy is supplied through electrodes immersed in the glass melt and means continuously detect the temperature of the glass stream, the improvement comprising: means independent of the glass melt resistance for maintaining a constant current flow between coacting electrodes including means for controlling the voltage when the temperature of the glass stream varies within predetermined limits; and means for adjusting the value of the constant current flow of at least a plurality of electrodes at the inlet of the feeder when the temperature of the glass stream exceeds said limits to compensate for the temperature change; and wherein a plurality of contacts are arranged in pairs at least upstream of the outlet and at said outlet, the contacts being in contact with the refractory material of the feeder and connected to the maintaining means.

5. The system according to claim 4, wherein the maintaining means comprises transformers and wherein the electrodes pass on opposite sides through the wall of the feeder in pairs wherein, a current regulator is connected on the primary side of each transformer and said electrodes of each pair are connected to the output end of the secondary winding of the variable transformer at least in the inlet region of said feeder means for defining a fixed ratio of the voltages of said transformers for a number of adjacently positioned pairs of electrodes with respect to each other, and wherein the adjusting means adjusts the instant currents without varying the fixed ratio.

6. The system according to claim 5, wherein a plurality of electrodes are provided downstream of the inlet of said feeder, connected to the secondary side of one transformer in parallel.

7. The system according to claim 5 or claim 6, wherein the plurality of contacts arranged in pairs at least upstream of the outlet of said feeder and at said outlet have each pair of contacts conductively connected to the secondary side of one transformer.

* * * * *